(12) United States Patent
Han et al.

(10) Patent No.: US 12,711,212 B2
(45) Date of Patent: Aug. 18, 2026

(54) ELECTRONIC DEVICE COMPRISING SENSOR MODULE

(71) Applicant: SAMSUNG ELECTRONICS CO., LTD., Suwon-si (KR)

(72) Inventors: Seonho Han, Suwon-si (KR); Minhyuk Nam, Suwon-si (KR); Yongyi Kim, Suwon-si (KR); Sunghwa Park, Suwon-si (KR); Jin Sagong, Suwon-si (KR); Seungho Lee, Suwon-si (KR); Juhee Chang, Suwon-si (KR); Kiwook Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/218,693

(22) Filed: Jul. 6, 2023

(65) Prior Publication Data

US 2023/0350993 A1 Nov. 2, 2023

Related U.S. Application Data

(63) Continuation of application No. PCT/KR2021/020147, filed on Dec. 29, 2021.

(30) Foreign Application Priority Data

Feb. 17, 2021 (KR) ........................ 10/2021-0021081

(51) Int. Cl.
*G06F 15/16* (2006.01)
*G06F 1/16* (2006.01)
(Continued)

(52) U.S. Cl.
CPC .............. *G06F 21/32* (2013.01); *G06F 1/163* (2013.01); *G06F 1/1658* (2013.01);
(Continued)

(58) Field of Classification Search
CPC ........ G06F 21/32; G06F 1/163; G06F 1/1658; G06F 1/1684; H05K 1/189; H05K 5/0065;
(Continued)

(56) References Cited

U.S. PATENT DOCUMENTS 7,043,296 B1 * 5/2006 Kasai .................. A61B 5/0245 600/547
11,156,965 B1 * 10/2021 Trapero Martin ..... A61B 5/681
(Continued)

FOREIGN PATENT DOCUMENTS

CN 110693481 A 1/2020
EP 3161582 B1 * 9/2021 ............. H04W 4/80
(Continued)

OTHER PUBLICATIONS

Communication dated Jun. 6, 2024 by the European Patent Office in EP Application No. 21926933.9.
(Continued)

*Primary Examiner* — Hamza N Algibhah
(74) *Attorney, Agent, or Firm* — Sughrue Mion, PLLC

(57) ABSTRACT

An electronic device includes: a housing; a battery disposed in the housing; and a sensor module at least partially disposed in the housing, wherein the sensor module includes: a board; a biometric recognition sensor disposed on the board; a sealing member around at least a part of the board and at least part of the biometric recognition sensor, and a biosignal sensing electrode around at least a part of the sealing member, wherein the biosignal sensing electrode is electrically connected to the board and at least partially exposed outside of the housing.

13 Claims, 8 Drawing Sheets

(51) Int. Cl.

| | |
|---|---|
| ***G06F 9/54*** | (2006.01) |
| ***G06F 21/32*** | (2013.01) |
| ***H04L 29/06*** | (2006.01) |
| ***H05K 1/189*** | (2026.01) |
| ***H05K 5/00*** | (2006.01) |

(52) U.S. Cl.
CPC .......... *G06F 1/1684* (2013.01); *H05K 1/189* (2013.01); *H05K 5/0065* (2013.01)

(58) Field of Classification Search
CPC ... A61B 5/1172; A61B 5/681; A61B 5/02438; A61B 5/0537; A61B 5/0533; A61B 5/256; A61B 5/28; A61B 5/0024; A61B 5/0245; A61B 2560/0204; G04G 17/02; G04G 21/025
USPC .......................................................... 713/186
See application file for complete search history.

(56) References Cited

U.S. PATENT DOCUMENTS

| | | | | |
|---|---|---|---|---|
| 2012/0190959 | A1* | 7/2012 | Hayakawa | A61B 5/291 600/383 |
| 2014/0337621 | A1* | 11/2014 | Nakhimov | H04W 12/068 713/168 |
| 2015/0145673 | A1* | 5/2015 | Choi | A61B 5/0082 340/539.12 |
| 2015/0289763 | A1* | 10/2015 | Morshed | A61B 5/0015 340/870.07 |
| 2015/0379251 | A1* | 12/2015 | Komaki | G06V 40/1365 726/19 |
| 2016/0029959 | A1* | 2/2016 | Le | A61B 5/6835 600/383 |
| 2016/0042219 | A1* | 2/2016 | Bae | G06V 40/1359 382/124 |
| 2017/0119307 | A1* | 5/2017 | Shim | A61B 5/7475 |
| 2017/0286739 | A1 | 10/2017 | Shibano et al. | |
| 2017/0286748 | A1 | 10/2017 | Kim et al. | |
| 2018/0165493 | A1* | 6/2018 | Noh | G06V 40/1376 |
| 2018/0360326 | A1 | 12/2018 | Lee et al. | |
| 2019/0101870 | A1* | 4/2019 | Pandya | A61B 5/681 |
| 2019/0163953 | A1* | 5/2019 | Jin | G06F 18/254 |
| 2020/0138288 | A1 | 5/2020 | Al-Ali et al. | |
| 2021/0319782 | A1* | 10/2021 | Gong | G06F 3/167 |
| 2021/0365664 | A1* | 11/2021 | Lee | A61B 5/02007 |
| 2022/0083199 | A1* | 3/2022 | Van Os | G06F 3/04817 |
| 2023/0360444 | A1* | 11/2023 | Jenson | G06F 21/32 |

FOREIGN PATENT DOCUMENTS

| | | | | | |
|---|---|---|---|---|---|
| JP | 2002-165767 | A | | 6/2002 | |
| JP | 2003-83708 | A | | 3/2003 | |
| JP | 2017-187478 | A | | 10/2017 | |
| JP | 2018-139757 | A | | 9/2018 | |
| KR | 10-2017-0003274 | A | | 1/2017 | |
| KR | 10-2017-0077993 | A | | 7/2017 | |
| KR | 10-2017-0135099 | A | | 12/2017 | |
| KR | 10-2018-0024275 | A | | 3/2018 | |
| KR | 10-2018-0136242 | A | | 12/2018 | |
| KR | 10-2019-0077850 | A | | 7/2019 | |
| KR | 10-2009463 | B1 | | 8/2019 | |
| KR | 20210116944 | A | * | 9/2021 | A61B 5/6843 |
| KR | 102463383 | B1 | * | 11/2022 | A61B 5/6803 |
| KR | 20240028888 | A | * | 3/2024 | A61B 5/02416 |
| WO | 2017/214582 | A1 | | 12/2017 | |

OTHER PUBLICATIONS

International Search Report (PCT/ISA/210) issued by the International Searching Authority on Apr. 11, 2022 in International Patent Application No. PCT/KR2021/020147.

Written Opinion (PCT/ISA/237) issued by the International Searching Authority on Apr. 11, 2022 in International Patent Application No. PCT/KR2021/020147.

Communication dated Sep. 15, 2025 by the European Patent Office in European Application No. 21926933.9.

Office Action dated Jan. 29, 2026, issued by Korean Ministry of Intellectual Property in Korean Patent Application No. 10-2021-0021081.

* cited by examiner

ELECTRONIC DEVICE COMPRISING SENSOR MODULE

CROSS-REFERENCE TO RELATED APPLICATIONS

This application is a by-pass continuation of International Application No. PCT/KR2021/020147, filed on Dec. 29, 2021, which is based on and claims priority to Korean Patent Application No. 10-2021-0021081, filed on Feb. 17, 2021, in the Korean Intellectual Property Office, the disclosures of which are incorporated by reference herein in their entireties.

BACKGROUND

1. Field

The disclosure relates to an electronic device including a sensor module.

2. Description of Related Art

An electronic device may refer to a device that performs a specific function according to a loaded program, such as an electronic notebook, a portable multimedia player, a mobile communication terminal, a tablet PC, a video/audio device, a desktop/laptop computer, or a vehicle navigation device as well as a home appliance. For example, these electronic devices may output stored information as sound or an image. As the integration level of electronic devices increases and high-speed and large-capacity wireless communication becomes common, a single electronic device such as a mobile communication terminal may be equipped with various functions in recent years. For example, various functions including a communication function, an entertainment function such as games, a multimedia function such as music/video playback, a communication and security function for mobile banking, schedule management, or an electronic wallet function are integrated into one electronic device. Such electronic devices are being miniaturized so that users may conveniently carry them. Owing to the development of electronic and communication technology, electronic devices become smaller and more lightweight so that they may be used conveniently, while worn on a body.

Because a wearable electronic device may be carried for a considerable amount of time in contact with a user's body, it may be useful in medicine and healthcare. For example, the electronic device may detect biometric information such as a photoplethysmograph (PPG), a sleep interval, a skin temperature, a heart rate, and electrocardiogram of the user according to an installed sensor. The detected biometric information may be stored in an electronic device or transmitted to a medical institution, for use in healthcare of the user.

In addition, the wearable electronic device may improve security using authentication information based on the user's body. For example, the electronic device may obtain user authentication information by detecting a fingerprint. However, when a sensor for detecting biometric information and a sensor for detecting the user's authentication information are present separately, a space for accommodating components of the electronic device may be reduced.

However, the problems to be solved in the disclosure are not limited to the above-mentioned problem, and may be extended in various ways without departing from the spirit and scope of the disclosure.

SUMMARY

One or more example embodiments provide an electronic device including a sensor module which includes a biosignal sensing electrode and a biometric sensor.

According to an aspect of the disclosure, an electronic device includes: a housing; a battery disposed in the housing; and a sensor module at least partially disposed in the housing, wherein the sensor module includes: a board; a biometric recognition sensor disposed on the board; a sealing member around at least a part of the board and at least part of the biometric recognition sensor, and a biosignal sensing electrode around at least a part of the sealing member, wherein the biosignal sensing electrode is electrically connected to the board and at least partially exposed outside of the housing.

The electronic device may further include at least one processor configured to: determine fingerprint information using the biometric recognition sensor, and determine biometric information using the biosignal sensing electrode.

The sensor module may further include: a flexible printed circuit board electrically connected to the biometric recognition sensor and the biosignal sensing electrode; and a connector mounted on the flexible printed circuit board.

The biosignal sensing electrode may form at least a part of a first surface of the sensor module, a third surface of the sensor module opposite to the first surface, and a second surface of the sensor module around at least a part between the first surface and the third surface.

The sensor module may further include a fingerprint sensing circuit.

The sensor module may further include a first area overlapping with the biometric recognition sensor and a second area in which the biosignal sensing electrode is disposed.

The sensor module may further include an ultrasonic transceiver configured to transmit or receive ultrasonic waves.

The sensor module may further include a shielding member disposed under the board, wherein the shielding member is configured to reduce propagation, into the electronic device, of ultrasonic waves generated by the ultrasonic transceiver.

The electronic device may further include a second sealing member disposed between the sensor module and the housing.

The sensor module may further include a color layer disposed on the sealing member.

The electronic device may further include an insulation structure disposed between the sensor module and the housing and surrounding at least a part of the sensor module.

The housing may include a front surface, a rear surface opposite to the front surface, and a side surface surrounding at least a part between the front surface and the rear surface, and the side surface may include a recess structure accommodating at least a part of the sensor module.

The sensor module may further include a first surface exposed outside of the electronic device, and the housing may further include a protection area including at least a part of the side surface and located higher than the first surface of the sensor module.

The electronic device may further include at least one fastening member detachably connected to the housing.

The electronic device may further include at least one electrode structure disposed on the housing and spaced apart from the biosignal sensing electrode.

According to one or more embodiments of the disclosure, an electronic device may obtain at least one piece of biometric information (e.g., an electrocardiogram signal, a heart rate signal, bioelectrical impedance analysis (VIA) information, and/or galvanic skin response information) and user authentication information (e.g., fingerprint information) using a biosignal sensing electrode and a biometric sensor.

According to one or more embodiments of the disclosure, the biosignal sensing electrode and the biometric sensor may be included in a single sensor module. As the biosignal sensing electrode and the biometric sensor are integrated, an arrangement space of the electronic device may be increased.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
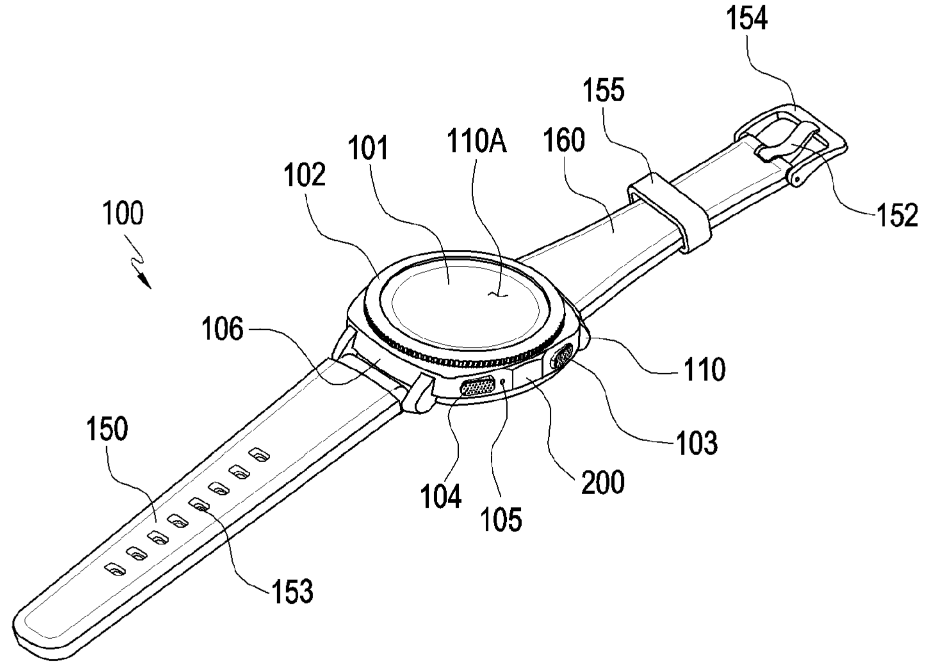
FIG. 1 is a front perspective view illustrating an electronic device according to various embodiments of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B, "at least one of A and B, "at least one of A or B, "A, B, or C, "at least one of A, B, and C, and "at least one of A, B, or C, may include any one of, or all possible combinations of the items enumerated together in a corresponding one of the phrases. As used herein, such terms as "1st" and "2nd, or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
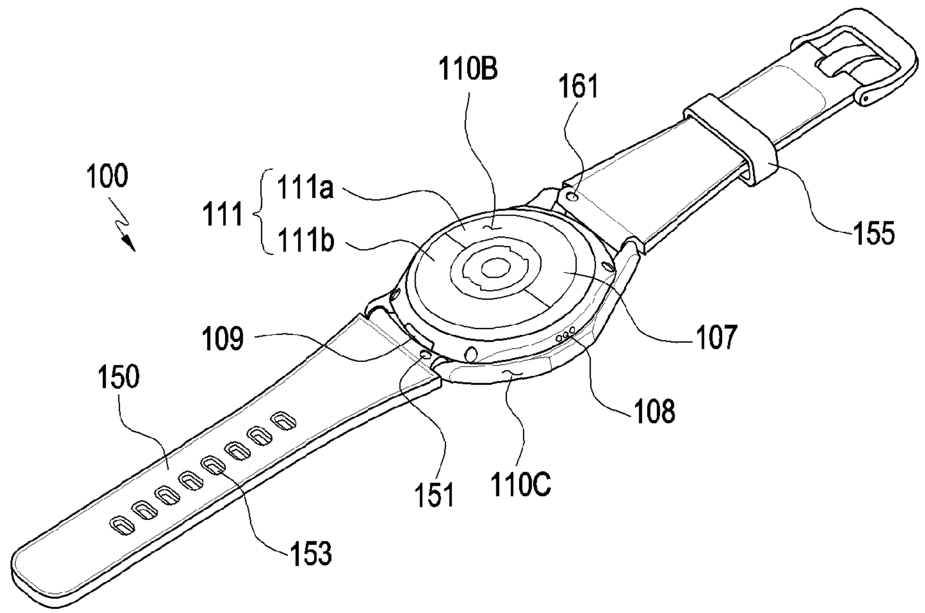
FIG. 2 is a rear perspective view illustrating an electronic device according to various embodiments of the disclosure.

FIG. 1 is a front perspective view illustrating an electronic device according to various embodiments of the disclosure. FIG. 2 is a rear perspective view illustrating an electronic device according to various embodiments of the disclosure.

Referring to FIGS. 1 and 2, an electronic device 100 is in the form of a watch, and a user may wear the electronic device 100. For example, the electronic device 100 may be a smart watch wearable around a user's wrist, or a wearable electronic device.

According to various embodiments, the electronic device 100 may include a housing 110 which includes a front surface 110A, a rear surface 110B, and a side surface 110C surrounding a space between the front surface 110A and the rear surface 110B, and at least one fastening member 150 and 160 connected to at least a part of the housing 110 and configured to be detachably fasten the electronic device 100 to a user's body part (e.g., wrist or ankle). In another embodiment, the housing may refer to a structure that forms a part of the front surface 110A, the rear surface 110B, and the side surface 110C of FIG. 1. According to an embodiment, at least a part of the front surface 110A may be formed by a front plate 101 (e.g., a glass plate or polymer plate including various coating layers) which is at least partially substantially transparent. The rear surface 110B may be formed by a substantially opaque rear plate 107. The rear plate 107 may be formed of, for example, coated or tinted glass, ceramic, a polymer, a metal (e.g., aluminum, stainless steel (STS), or magnesium), or a combination of at least two of these materials. The side surface 110C may be formed by a side bezel structure (or "side member") 106 coupled with the front plate 101 and the rear plate 107 and including a metal and/or a polymer. In a certain embodiment, the rear plate 107 and the side bezel structure 106 may be integrally formed and include the same material (e.g., a metal material such as aluminum). The fastening members 150 and 160 may be formed of any of various materials in any of various shapes. A woven fabric, leather, rubber, urethane, a metal, ceramic, or a combination of at least two of these materials may be used to form an integrated type and a plurality of unit links to be movable with each other.

According to an embodiment, the electronic device 100 may include at least one of a display (e.g., a display 120 of FIG. 3), audio modules 105 and 108, a sensor module 111, or key input devices 102, 103 and 104. In a certain embodiment, the electronic device 100 may not be provided with at least one (e.g., the key input devices 102, 103 and 104 or the sensor module 111) of the components or additionally include other components.

According to an embodiment, the display 120 may be exposed, for example, through a substantial portion of the front plate 101. The shape of the display 120 may correspond to that of the front plate 101, and may be in any of various shapes such as a circle, an oval, or a polygon. The display 120 may be incorporated with or disposed adjacent to a touch sensing circuit, a pressure sensor that measures the intensity (pressure) of a touch, and/or a fingerprint sensor.

The audio modules 105 and 108 may convert a sound into an electrical signal or vice versa. The audio modules 105 and 108 may include a microphone hole 105 and a speaker hole 108. A microphone for obtaining an external sound may be disposed in the microphone hole 105, and in a certain embodiment, a plurality of microphones may be disposed to detect the direction of a sound. The speaker hole 108 may be used as an external speaker and a receiver for calls. In a certain embodiment, the speaker hole 108 and the microphone hole 105 may be implemented as a single hole, or a speaker (e.g., a piezo speaker) may be included without the speaker hole 108.

The key input devices 102, 103, and 104 may include a wheel key 102 disposed on the first surface 110A of the housing 110 and rotatable in at least one direction, and/or side key buttons 103 and 104 disposed on the side surface 110C of the housing 110. The wheel key 102 may have a shape corresponding to that of the front plate 101. In another embodiment, the electronic device 100 may not include some or any of the above-mentioned key input devices 102, 103, and 104, and the non-included key input devices 102, 103, and 104 may be implemented in another form such as a soft key on the display 120. The connector hole 109 may accommodate a connector (e.g., a USB connector) for transmitting and receiving power and/or data to and from an external electronic device, and another connector hole for accommodating a connector for transmitting and receiving an audio signal to and from an external electronic device. The electronic device 100 may further include, for example, a connector cover that covers at least a part of the connector hole 109 and blocks the introduction of a foreign material into the connector hole 109.

The fastening members 150 and 160 may be detachably connected to at least a partial area of the housing 110 using locking members 151 and 161. The fastening members 150 and 160 may include one or more of a fixing member 152, a fixing member fastening hole 153, a band guide member 154, and a band fixing loop 155.

The fixing member 152 may be configured to fix the housing 110 and the fastening members 150 and 160 to the user's body part (e.g., a wrist or an ankle). The fixing member fastening hole 153 may fix the housing 110 and the fastening members 150 and 160 to the user's body part in correspondence with the fixing member 152. The band guide member 154 may be configured to limit a movement range of the fixing member 152, when the fixing member 152 is fastened in the fixing member fastening hole 153, so that the fastening members 150 and 160 are fastened to the user's body part in close contact. The band fixing loop 155 may limit movement ranges of the fastening members 150 and 160, with the fixing member 152 fastened in the fixing member fastening hole 153.

According to various embodiments, the electronic device 100 may include sensor modules 111 and 200. The sensor modules 111 and 200 may generate an electrical signal or data value corresponding to an internal operation state of the electronic device 100 or an external environmental state. The sensor modules 111 and 200 may include a first sensor module 200 disposed on the side surface 110C of the housing 110 and a second sensor module 111 disposed on the rear surface 110B of the housing 110. The first sensor module 200 may be disposed adjacent to the side key buttons 103 and 104. For example, the first sensor module 200 may be disposed between the side key buttons 103 and 104. According to an embodiment, the first sensor module 200 may be a dummy key exposed to the outside of the housing 110. For example, the first sensor module 200 may protrude to the outside of the side surface 110C of the housing 110, and may be an electronic component that does not substantially move by pressure transmitted from the outside of the first sensor module 200 to the first sensor module 200. According to an embodiment, the user's body part (e.g., a finger) may contact a part (e.g., a biosignal sensing electrode 210 of FIG. 4A) of the first sensor module 200, and the first sensor module 200 may detect an electrical signal for determining biometric information (e.g., bioelectrical impedance analysis information) and/or authentication information (e.g., a fingerprint) about the user. According to an embodiment, the second sensor module 111 may include a plurality of electrode structures 111*a* and 111*b* (e.g., an HRM sensor). The electronic device 100 may further include a sensor module, for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor. According to an embodiment, a processor (e.g., a processor 202 of FIG. 5) may determine biometric information (e.g., an electrocardiogram signal, a heart rate signal, bioelectric impedance analysis (BIA) information, and galvanic skin response information) based on a signal obtained from the first sensor module 200 and/or the second sensor module 111.

Figure 3:
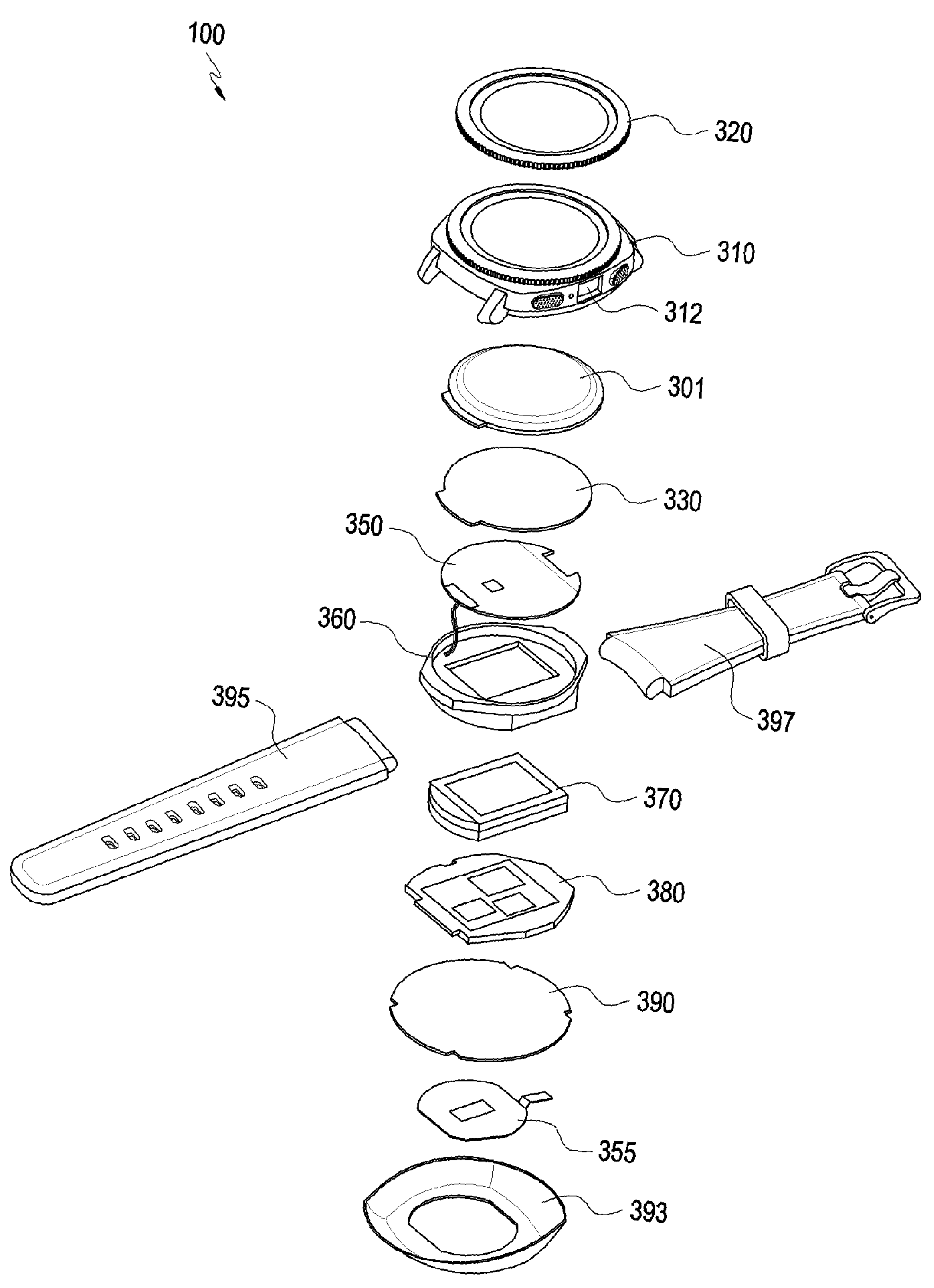
FIG. 3 is an exploded perspective view illustrating an electronic device according to various embodiments of the disclosure.

FIG. 3 is an exploded perspective view illustrating an electronic device according to various embodiments of the disclosure.

Referring to FIG. 3, the electronic device 100 may include a side bezel structure 310, a wheel key 320, a front plate 101, the display 120, a first antenna 350, a second antenna 355, a support member 360 (e.g., a bracket), a battery 370, a printed circuit board (PCB) 380, a sealing member 390, a rear plate 393, and fastening members 395 and 397. At least one of the components of the electronic device 100 may be the same as or similar to at least one of the components of the electronic device 100 of FIG. 1 or FIG. 2, and a redundant description will be avoided herein. The support member 360 may be disposed inside the electronic device 100 and connected to the side bezel structure 310, or may be integrally formed with the side bezel structure 310. The support member 360 may be formed of, for example, a metal material and/or a non-metal (e.g., polymer) material. The support member 360 may have one surface coupled with the display 120 and the other surface coupled with the PCB 380. The PCB 380 may have a processor, memory, and/or an interface mounted thereon. The processor may include, for example, one or more of a central processing unit (CPU), an application processor (AP), a graphic processing unit (GPU), an application processor (AP) sensor processor, or a communication processor (CP).

The memory may include, for example, volatile memory or non-volatile memory. The interface may include, for example, a high definition multimedia interface (HDMI), a universal serial bus (USB) interface, a secure digital (SD) card interface, and/or an audio interface. The interface may, for example, electrically or physically connect the electronic device 100 to an external electronic device, and include a USB connector, an SD card/multimedia card (MMC) connector, or an audio connector.

The display 120 may visually provide information to the outside (e.g., the user) of the electronic device 100. The display 120 may include, for example, a display panel, a hologram device, or a projector, and a control circuit for controlling a corresponding device. According to an embodiment, the display 120 may include a touch sensor configured to detect a touch or a pressure sensor configured to measure the strength of a force generated by a touch.

The battery 370 is a device for supplying power to at least one component of the electronic device 100, and may include, for example, a non-rechargeable primary battery, a rechargeable secondary battery, or a fuel cell. At least a part of the battery 370 may be disposed substantially on the same plane as the PCB 380. The battery 370 may be integrally disposed inside the electronic device 100 or disposed detachably from the electronic device 100. According to an embodiment, the battery 370 may be disposed inside a housing (e.g., the housing 110 of FIG. 1) of the electronic device 100.

The first antenna 350 may be disposed between the display 120 and the support member 360. The first antenna 350 may include, for example, a near field communication (NFC) antenna, a wireless charging antenna, and/or a magnetic secure transmission (MST) antenna. The first antenna 350 may, for example, perform short-range communication with an external device or wirelessly transmit and receive power required for charging, and transmit a magnetic-based signal including a short-range communication signal or payment data. In another embodiment, an antenna structure may be formed by a part of the side bezel structure 310 and/or the support member 360 or a combination of them.

The second antenna 355 may be disposed between the PCB 380 and the rear plate 393. The second antenna 355 may include, for example, an NFC antenna, a wireless charging antenna, and/or an MST antenna. The second antenna 355 may, for example, perform short-range communication with an external device or wirelessly transmit and receive power required for charging, and transmit a magnetic-based signal including a short-range communication signal or payment data. In another embodiment, an antenna structure may be formed by part of the side bezel structure 310 and/or the rear plate 393 or a combination of them.

The sealing member 390 may be located between the side bezel structure 310 and the rear plate 393. The sealing member 390 may be configured to block the introduction of moisture and a foreign material from the outside into a space surrounded by the side bezel structure 310 and the rear plate 393.

According to various embodiments, the side bezel structure 310, the support member 360, and/or the rear plate 393 may be interpreted as a housing (e.g., the housing 110 of FIG. 1). For example, the side bezel structure 310 may form at least a part of a side surface (e.g., the side surface 110C of FIG. 2) of the housing 110.

According to various embodiments, the side bezel structure 310 may include a recess structure 312. According to an embodiment, the recess structure 312 may accommodate at least a part of the sensor module 200. At least a part of the sensor module 200 may be disposed within the recess structure 312 and the other part thereof may be exposed to the outside of the side bezel structure 310. According to an embodiment, the recess structure 312 may be a groove or a through hole. According to an embodiment, the recess structure 312 may be interpreted as a groove or a through hole formed on the side surface 110C of the housing 110.

Figure 4A:
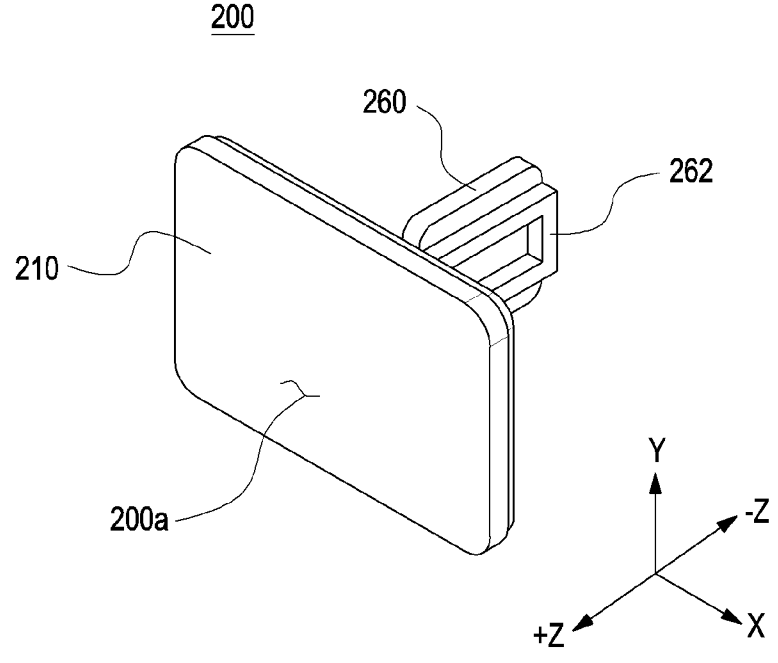
FIG. 4A is a front perspective view illustrating a sensor module according to various embodiments of the disclosure.
Figure 4B:
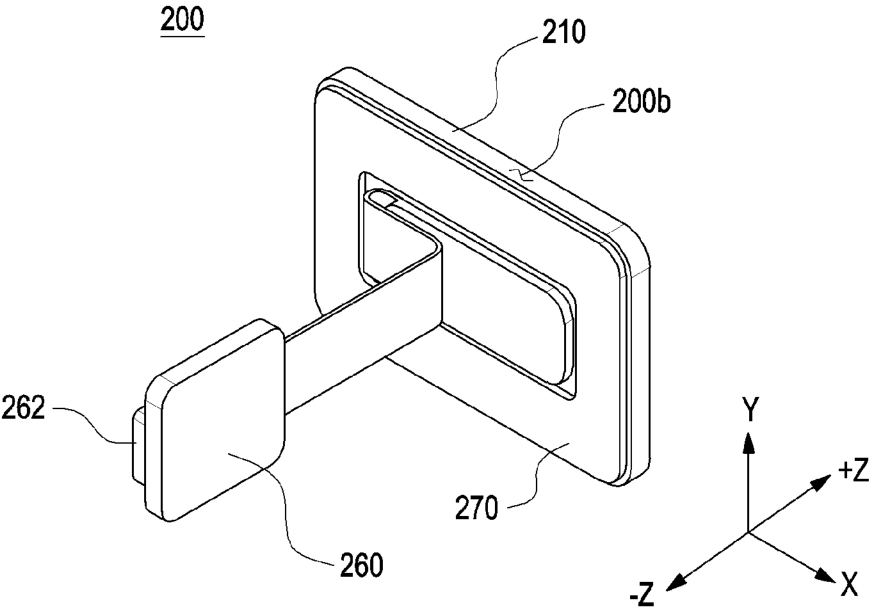
FIG. 4B is a rear perspective view illustrating the sensor module according to various embodiments of the disclosure.
Figure 5:
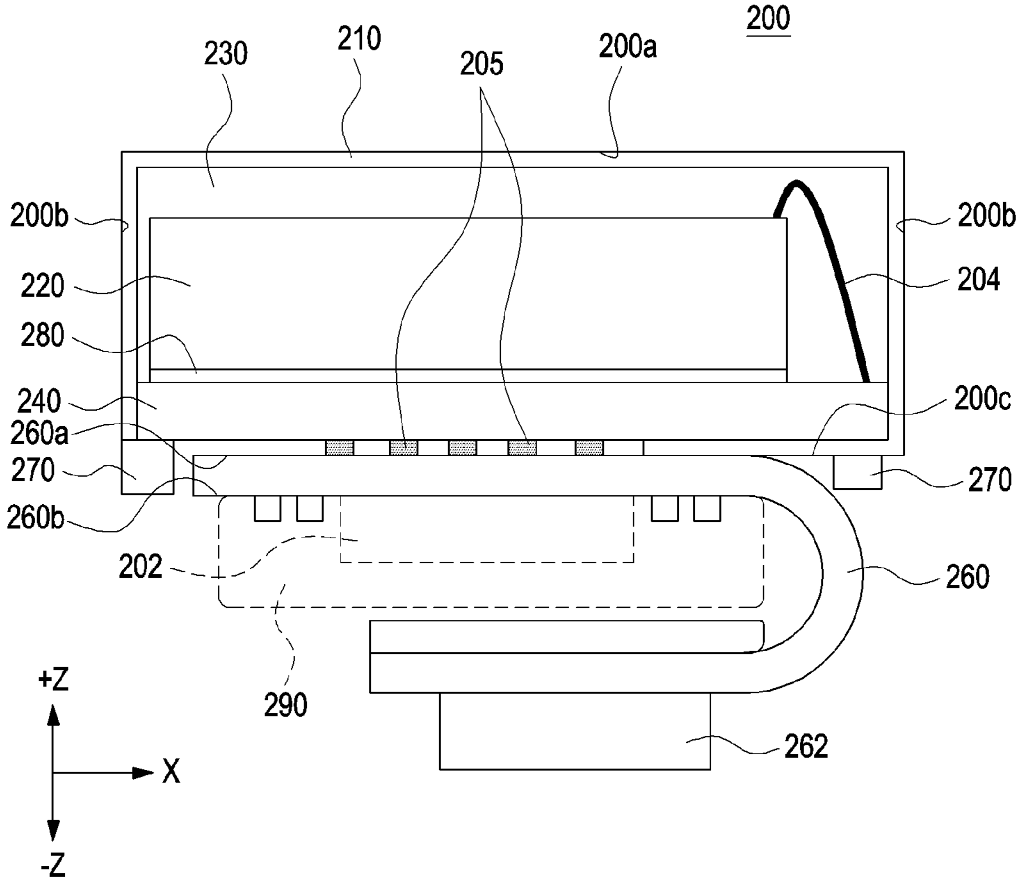
FIG. 5 is a cross-sectional view illustrating a sensor module according to various embodiments of the disclosure.

FIG. 4A is a front perspective view illustrating a sensor module according to various embodiments of the disclosure, and FIG. 4B is a rear perspective view illustrating the sensor module according to various embodiments of the disclosure. FIG. 5 is a cross-sectional view illustrating the sensor module according to various embodiments of the disclosure.

Referring to FIGS. 4A, 4B, and 5, the sensor module 200 may include a biosignal sensing electrode 210, a biometric recognition sensor 220, and a sealing member 230. The configuration of the sensor module 200 of FIGS. 4A, 4B, and 5 may be wholly or partially the same as that of the sensor module 200 of FIG. 1.

According to various embodiments, the biosignal sensing electrode 210 may receive or detect a user's bioelectrical signal. For example, the biosignal sensing electrode 210 may be exposed to the outside of a housing (e.g., the housing 110 of FIG. 1) of an electronic device (e.g., the electronic device 100 of FIG. 1).

According to various embodiments, the biosignal sensing electrode 210 may contact a user's finger and transmit a signal reflecting a bioelectrical signal to the processor 202. For example, the biosignal sensing electrode 210 may be electrically connected to a board 240 and/or a flexible printed circuit board (FPCB) 260.

According to an embodiment, the biosignal sensing electrode 210 may include a conductive material. According to an embodiment, the biosignal sensing electrode 210 may include a metal and/or graphene. For example, the biosignal sensing electrode 210 may be a metal layer deposited on the sensor module 200 or a conductive coating surrounding at least a part (e.g., the sealing member 230 and the board 240) of the sensor module 200.

According to an embodiment, the biosignal sensing electrode 210 may form at least a part of the outer surface of the sensor module 200. For example, the sensor module 200 may include a first surface 200*a* (e.g., a front surface) exposed to the outside of the housing 110, a third surface 200*c* (e.g., a rear surface) opposite to the first surface 200*a*, and a second surface 200*b* (e.g., a side surface) surrounding at least a part between the first surface 200*a* and the third surface 200*c*. The biosignal sensing electrode 210 may form at least a part of the first surface 200*a*, the second surface 200*b*, and the third surface 200*c* of the sensor module 200. According to various embodiments, the biometric recognition sensor 220 may obtain or detect biometric authentication information of the user. For example, the biometric recognition sensor 220 may detect information (e.g., a fingerprint type) reflecting a fingerprint of the user's finger located on the first surface 200*a* of the sensor module 200. The biometric recognition sensor 220 may be interpreted as a fingerprint recognition sensor. According to various embodiments, the biometric recognition sensor 220 may be disposed within the sensor module 200. For example, the biometric recognition sensor 220 may be disposed on the board 240 using an adhesive member 280 (e.g., a die attach film (DAF)). According to an embodiment, the biometric recognition sensor 220 may be a capacitive fingerprint sensor, an ultrasonic fingerprint sensor, or an optical fingerprint sensor. According to an embodiment, the sensor module 200 may include the biosignal sensing electrode 210 and the biometric recognition sensor 220. For example, the biometric recognition sensor 220 may be provided as a component integrated with the biosignal sensing electrode 210. For example, the biosignal sensing electrode 210 and the biometric recognition sensor 220 may be disposed together in the single sensor module 200. According to an embodiment, the biometric recognition sensor 220 and the biosignal sensing electrode 210 may be included in one package.

According to various embodiments, the sealing member 230 may protect electronic components (e.g., the biometric recognition sensor 220 and the board 240) of the sensor module 200 from shocks outside the sensor module 200. According to an embodiment, the sealing member 230 may surround at least a part of the board 240 and/or at least a part of the biometric recognition sensor 220. For example, the sealing member 230 may include an epoxy molding compound (EMC). According to an embodiment, the sealing member 230 may include at least one lens. For example, the biometric recognition sensor 220 may be an optical fingerprint recognition sensor, and the sealing member 230 may include at least one lens that transmits light generated by the biometric recognition sensor 220 to the outside of the sensor module 200 or transmits at least a part of light reflected from the outside of the sensor module 200 to the biometric recognition sensor 220. According to an embodiment, the sealing member 230 may include an empty space where air is located.

Figure 6A:
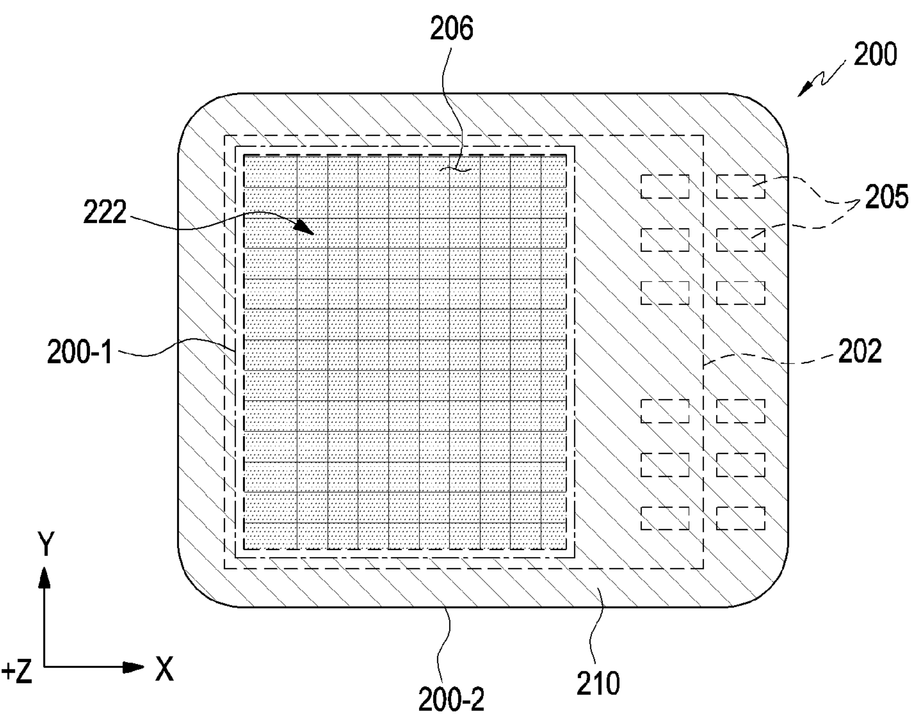
FIGS. 6A and 6B are front views illustrating a sensor module according to an embodiment of the disclosure.

According to an embodiment, the sealing member 230 may be surrounded by the biosignal sensing electrode 210 and/or a color layer (e.g., a color layer 206 of FIG. 6A). For example, the sealing member 230 may be located within an inner space of the sensor module 200 formed by the biosignal sensing electrode 210.

According to various embodiments, the sensor module 200 may include the board 240. The board 240 may be a PCB and accommodate at least one electronic component (e.g., the biometric recognition sensor 220). According to an embodiment, the board 240 may be electrically connected to a main PCB (e.g., the PCB 380 of FIG. 3) and/or a battery (e.g., the battery 370 of FIG. 3). For example, the sensor module 200 may be connected to the board 240 and include the FPCB 260 including a connector 262, and the board 240 may be electrically connected to the main PCB 380 and/or the battery 370 using the FPCB 260.

According to various embodiments, the sensor module 200 may include the FPCB 260. According to an embodiment, the FPCB 260 may be electrically connected to the biosignal sensing electrode 210 and the biometric recognition sensor 220. For example, the FPCB 260 may be electrically connected to the board 240 on which the biometric recognition sensor 220 is mounted using at least one pad 105 (e.g., a conductive pad). For example, at least a part (e.g., a pad) of the FPCB 260 may contact the biosignal sensing electrode 210 and be electrically connected to the biosignal sensing electrode 210. According to an embodiment, the FPCB 260 may face the board 240 and have a first FPCB surface 260*a* on which the at least one pad 105 is located and a second FPCB surface 260*b* opposite to the first FPCB surface 260*a*. The third surface 200*c* of the sensor module 200 may be electrically connected to the first FPCB surface 260*a* through the at least one pad 105. According to an embodiment, the processor 202 may be located on the second FPCB surface 260*b*.

According to various embodiments, the sensor module 200 of the electronic device (e.g., the electronic device 100 of FIG. 1) may include at least one sealing member 270. According to an embodiment, the sealing member 270 may be disposed between the sensor module 200 and the housing (e.g., the housing 110 of FIG. 1). For example, the sealing member 270 may be disposed on the third surface 200*c* of the sensor module 200. The sensor module 200 may be attached to or connected to the housing 110 using the sealing member 270. According to an embodiment, the sealing member 270 may be a waterproof member (e.g., a waterproof tape) and/or an adhesive member (e.g., an adhesive tape). According to an embodiment, the sealing member 270 may be formed in the shape of a closed loop. Those skilled in the art will easily understand that at least one of the number, material and/or shape of the sealing member 270 is not limited to the above description.

According to various embodiments, the sensor module 200 may include a shielding member 290. According to an embodiment, the shielding member 290 may reduce or prevent transmission of a part of a radio wave (e.g., ultrasonic wave) or an electrical signal generated by the processor 202 or the biometric recognition sensor 220 to another electronic component (e.g., the PCB 380 of FIG. 3) of the electronic device (e.g., the electronic device 100 of FIG. 1). For example, the shielding member 290 may be a metal coating layer or a shield can. According to an embodiment, the shielding member 290 may be disposed below the biometric recognition sensor 220 (e.g., in a −Z direction). For example, the shielding member 290 may be disposed on the board 240 or the FPCB 260. According to an embodiment, the shielding member 290 may be disposed to surround the processor 202 disposed on the board 240 or the FPCB 260. According to an embodiment, the shielding member 290 may be omitted.

According to various embodiments, the electronic device (e.g., the electronic device 100 of FIG. 1) may include the processor 202. The processor 202 may, for example, execute software (e.g., a program) to control at least one other component (e.g., hardware or software component) of the electronic device 100, connected to the processor 202 and perform various data processes or computations. According to an embodiment, as at least a part of the data processes or computations, the processor 202 may store a command or data received from another component (e.g., the sensor module 200 of FIG. 4A) in volatile memory, process the command or the data stored in the volatile memory, and store resulting data in non-volatile memory.

According to an embodiment, the processor 202 may determine biometric information using the biosignal sensing electrode 210 of the sensor module 200. For example, the processor 202 may determine the biometric information based on an electrical signal obtained from a user's body (e.g., a finger or a wrist) using the biosignal sensing electrode 210 and the plurality of electrode structures 111*a* and 111*b*. The biometric information may include at least some of an electrocardiogram signal, a heart rate signal, BIA information, and/or galvanic skin response information. According to an embodiment, the processor 202 may include a circuit (module) for receiving and processing a biosignal. For example, the processor 202 may include at least one of a front end module (FEM), a switch, an amplifier, an analog-to-digital converter (ADC), or a logic circuit. According to an embodiment, the processor 202 may determine biometric authentication information (e.g., fingerprint information) using the biometric recognition sensor 220 of the sensor module 200. For example, the processor 202 may determine information about the shape of a fingerprint based on an electrical signal obtained from the biometric recognition sensor 220.

According to an embodiment (e.g., FIG. 5), the processor 202 may be a separate electronic component spaced apart from the biometric recognition sensor 220. For example, the biometric recognition sensor 220 may be electrically connected to the board 240 and/or the FPCB 260 on which the processor 202 is located using a wire 204 and/or the pad 205. According to another embodiment, the biometric recognition sensor 220 may include a processor (e.g., a microprocessor) for processing information reflecting a detected fingerprint of a user's finger. For example, the processor 202 may be integrated into the biometric recognition sensor 220. For example, the processor 202 may be implemented as an integrated chip (e.g., an integrated driving circuit), together with the biometric recognition sensor 220. According to an embodiment (e.g., FIG. 5), although the processor 202 may be located within the sensor module 200, the position of the processor 202 is not limited thereto. For example, the processor 202 may be located on the main PCB (e.g., the PCB 380 of FIG. 3). According to an embodiment, the processor 202 may determine biometric information using the biosignal sensing electrode 210 and fingerprint information using the biometric recognition sensor 220.

Figure 6B:
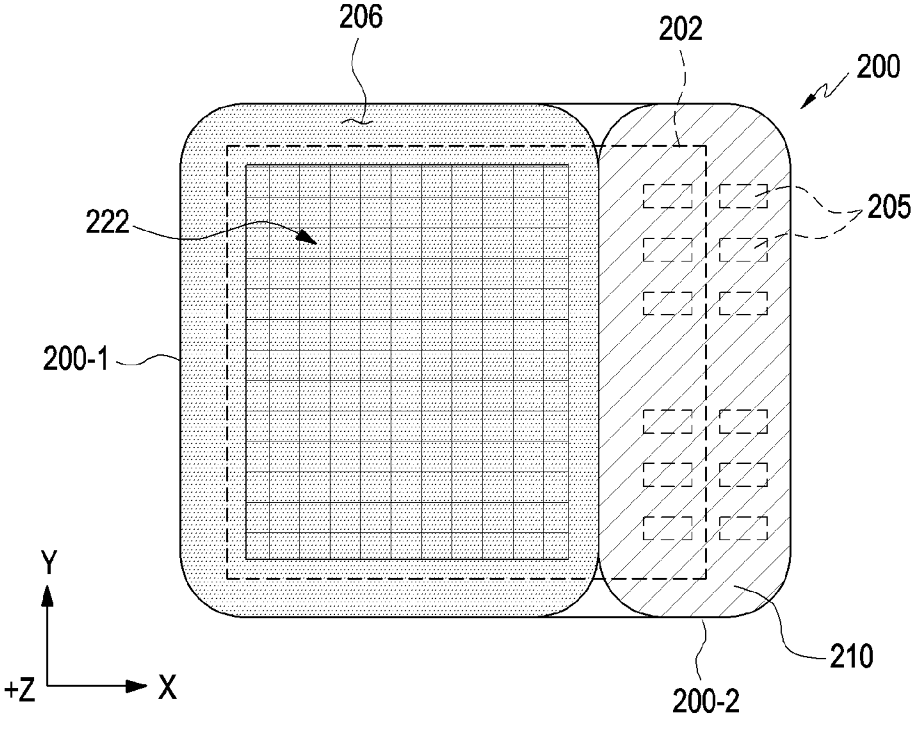

FIGS. 6A and 6B are front views illustrating a sensor module according to an embodiment of the disclosure.

Referring to FIGS. 6A and 6B, the sensor module 200 may include a fingerprint sensing circuit 222. The configuration of the sensor module 200 in FIGS. 6A and 6B may be wholly or partially the same as that of the sensor module 200 in FIG. 5.

According to various embodiments, the biometric recognition sensor (e.g., the biometric recognition sensor 220 of FIG. 5) of the sensor module 200 may operate in a capacitance manner. For example, the biometric recognition sensor 220 of the sensor module 200 may include the fingerprint sensing circuit 222. The fingerprint sensing circuit 222 may be interpreted as a sensing array including a plurality of sensors (e.g., pixels). According to an embodiment, the biometric recognition sensor 220 of the sensor module 200 may detect the capacitances of curves (e.g., valleys and ridges) of a user's fingerprint, and recognize or detect the shape of the fingerprint based on differences among the capacitances. According to an embodiment, the fingerprint sensing circuit 222 may be connected to the processor 202 using the at least one pad 105.

According to various embodiments, the biosignal sensing electrode 210 may be disposed in a structure for reducing distortion in an operation of the fingerprint sensing circuit 222. For example, when viewing the sensor module 200 from above (e.g., from a +Z direction), the sensor module 200 may include a first area 200-1 overlapping with at least a part of the biometric recognition sensor 220 (e.g., the fingerprint sensing circuit 222) and a second area 200-2 spaced apart from the first area 200-1, in which the biosignal sensing electrode 210 is disposed. According to an embodiment, the first area 200-1 may be interpreted as an area covering the fingerprint sensing circuit 222 (e.g., a capacitive sensing circuit). For example (e.g., FIGS. 6A and 6B), the first area 200-1 may be interpreted as a part of the sensor module 200 located on the fingerprint sensing circuit 222 (e.g., in the +Z direction). According to an embodiment, the first area 200-1 may include at least a part of the color layer 206 on (+Z direction) the fingerprint sensing circuit 222 of the biometric recognition sensor (e.g., the biometric recognition sensor 220 of FIG. 5). According to an embodiment, the second area 200-2 may be interpreted as an area covering the biosignal sensing electrode 210. According to an embodiment, the second area 200-2 may be spaced apart from the fingerprint sensing circuit 222 of the biometric recognition sensor (e.g., the biometric recognition sensor 220 of FIG. 5) in a width direction (e.g., X and Y directions) by a specified distance or more, and include the biosignal sensing electrode 210 on it (+Z direction). According to an embodiment (e.g., FIG. 6A), the second area 200-2 may surround the first area 200-1. According to an embodiment (e.g., FIG. 6B), at least a part of the second area 200-2 may be spaced apart from the color layer 206. According to another embodiment, the fingerprint sensing circuit 222 may overlap with the biosignal sensing electrode 210 by a predetermined size (e.g., width). For example, the second area 200-2 may overlap with at least a part of the fingerprint sensing circuit 222. In another example, the second area 200-2 may be located within a specified distance from the fingerprint sensing circuit 222 in the width direction (X and Y directions).

According to an embodiment, the sensor module 200 may include the color layer 206. The color layer 206 may form at least a part of the outer surface (e.g., the first surface 200*a* of FIG. 5) of the sensor module 200. For example, the color layer 206 may be disposed on the biosignal sensing electrode 210 and/or the sealing member 230. In another example, the color layer 206 may form at least a part of the outer surface of the sensor module 200, together with the biosignal sensing electrode 210. According to an embodiment, the color layer 206 may reduce or prevent visibility of a part of the biometric recognition sensor 220 (e.g., the fingerprint sensing circuit 222). For example, the color layer 206 may reflect at least some wavelengths in the visible ray band and transmit at least some wavelengths in the ultrasonic band. According to an embodiment, the color layer may include a color pigment. The color pigment may include at least one of titanium (Ti) oxide or nickel (Ni) oxide.

Figure 7:
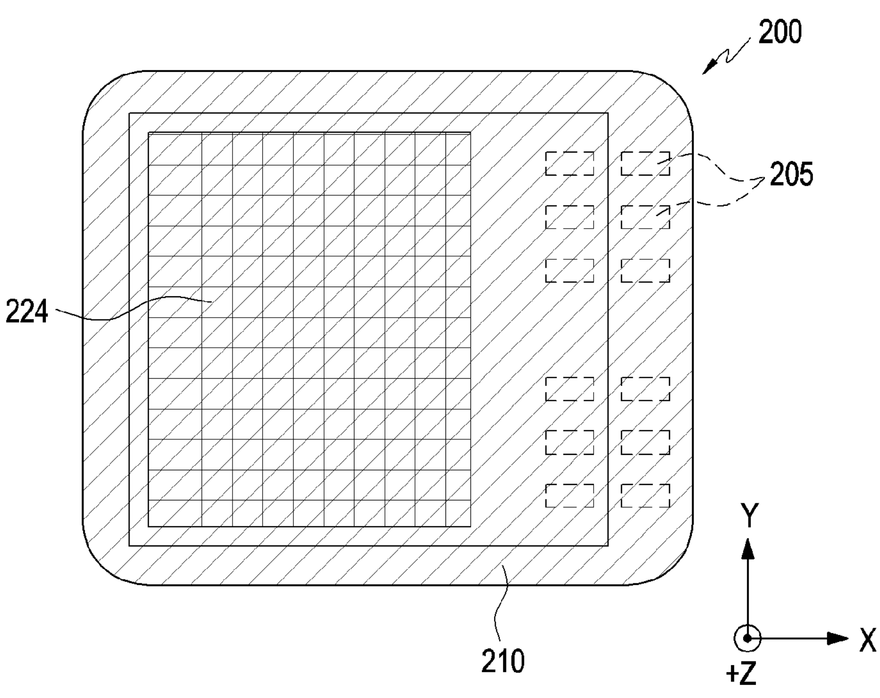
FIG. 7 is a front view illustrating a sensor module according to another embodiment of the disclosure.

FIG. 7 is a front view illustrating a sensor module according to another embodiment of the disclosure. For example, FIG. 7 is a diagram illustrating the sensor module 200 viewed from above (e.g., from the +Z direction).

Referring to FIG. 7, the sensor module 200 may include an ultrasonic transmission/reception device 224. The configuration of the sensor module 200 of FIG. 7 may be wholly or partially the same as the configuration of the sensor module 200 of FIG. 5.

According to various embodiments, the biometric recognition sensor (e.g., the biometric recognition sensor 220 of FIG. 5) of the sensor module 200 may recognize a user's fingerprint using ultrasonic waves. For example, the sensor module 200 may include the ultrasonic transmission/reception device 224 configured to transmit and/or receive ultrasonic waves to the outside of the sensor module 200. The ultrasonic transmission/reception device 224 may be an ultrasonic transceiver. According to an embodiment, the biometric recognition sensor 220 of the sensor module 200 may include a transducer that converts an electrical signal into vibrations (e.g., ultrasonic waves). According to an embodiment, the sensor module 200 may radiate ultrasonic waves generated by the transducer to the outside of the sensor module 200 through the ultrasonic transmission/reception device 224, and receive the ultrasonic waves reflected from the user's fingerprint. The electronic device (e.g., the electronic device 100 of FIG. 1) may determine the curves (e.g., valleys and ridges) of the fingerprint based on a time of receiving the radiated ultrasonic waves and recognize or detect the shape of the fingerprint. According to an embodiment, the ultrasonic transmission/reception device 224 may be connected to the processor 202 using the at least one pad 105.

According to various embodiments, the biosignal sensing electrode 210 may cover at least a part of the ultrasound transmission/reception device 224. For example, the biosignal sensing electrode 210 may be disposed on the ultrasonic transmission/reception device 224 (e.g., in the +Z direction).

Figure 8:
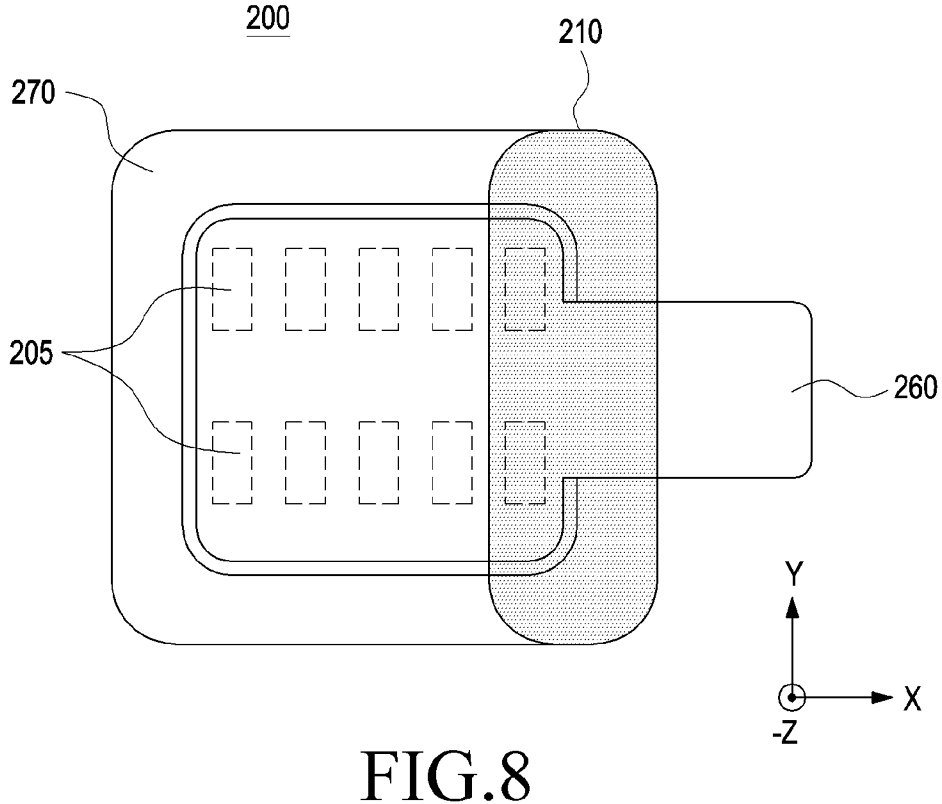
FIG. 8 is a rear view illustrating a sensor module, according to various embodiments of the disclosure.

FIG. 8 is a rear view illustrating a sensor module according to various embodiments of the disclosure. For example, FIG. 8 is a diagram illustrating the sensor module 200 viewed from below (e.g., from the −Z direction).

Referring to FIG. 8, the sensor module 200 may include the biosignal sensing electrode 210, the FPCB 260, and the sealing member 270. The configurations of the biosignal sensing electrode 210, the FPCB 260, and the sealing member 270 of FIG. 8 may be wholly or partially the same as those of the biosignal sensing electrode 210, the FPCB 260, and the sealing member 270 of FIG. 5.

According to various embodiments, the FPCB 260 may be connected to the biosignal sensing electrode 210. For example, at least a part of the biosignal sensing electrode 210 may be disposed on the rear surface (e.g., the third surface 200*c* of FIG. 5) of the sensor module 200 and contact the FPCB 260. The biosignal sensing electrode 210 may contact the user's body (e.g., a finger) on the first surface (e.g., the first surface 200*a* of FIG. 5) of the sensor module 200. An electrical signal obtained from the user's body may be transmitted to the FPCB 260 through the second surface (e.g., the second surface 200*b* in FIG. 5) and the third surface 200*c* of the sensor module 200 and the board (e.g., the board 240 of FIG. 5). According to an embodiment, the FPCB 260 may be electrically connected to a component (e.g., the biosignal sensing electrode 210, the biometric recognition sensor 220, and/or the board 240 in FIG. 5) of the sensor module 200 using the at least one pad 105. According to an embodiment, the FPCB 260 may be directly connected to the biosignal sensing electrode 210. For example, the FPCB 260 may be electrically connected to the biosignal sensing electrode 210 using an electrode disposed on the second FPCB surface 260*b*. According to an embodiment, the FPCB 260 may be electrically connected to the processor (e.g., the processor 202 of FIG. 5) using an electrode disposed on the second FPCB surface 260*b*.

According to various embodiments, at least a part of the sealing member 270 may be disposed on the biosignal sensing electrode 210. For example, at least a part of the sealing member 270 may be disposed on the third surface (e.g., the third surface 200*c* of FIG. 5) of the sensor module 200. For example, a part of the sealing member 270 may be disposed under the biosignal sensing electrode 210 (e.g., in the −Z direction), and another part thereof may be disposed under the board (e.g., the board 240 of FIG. 5 (in the −Z direction)) According to an embodiment, the sealing member 270 may be disposed between the board 240 and the housing (e.g., the housing 110 of FIG. 9) and/or between the biosignal sensing electrode (e.g., the biosignal sensing electrode 210 of FIG. 9) and the housing 110.

Figure 9:
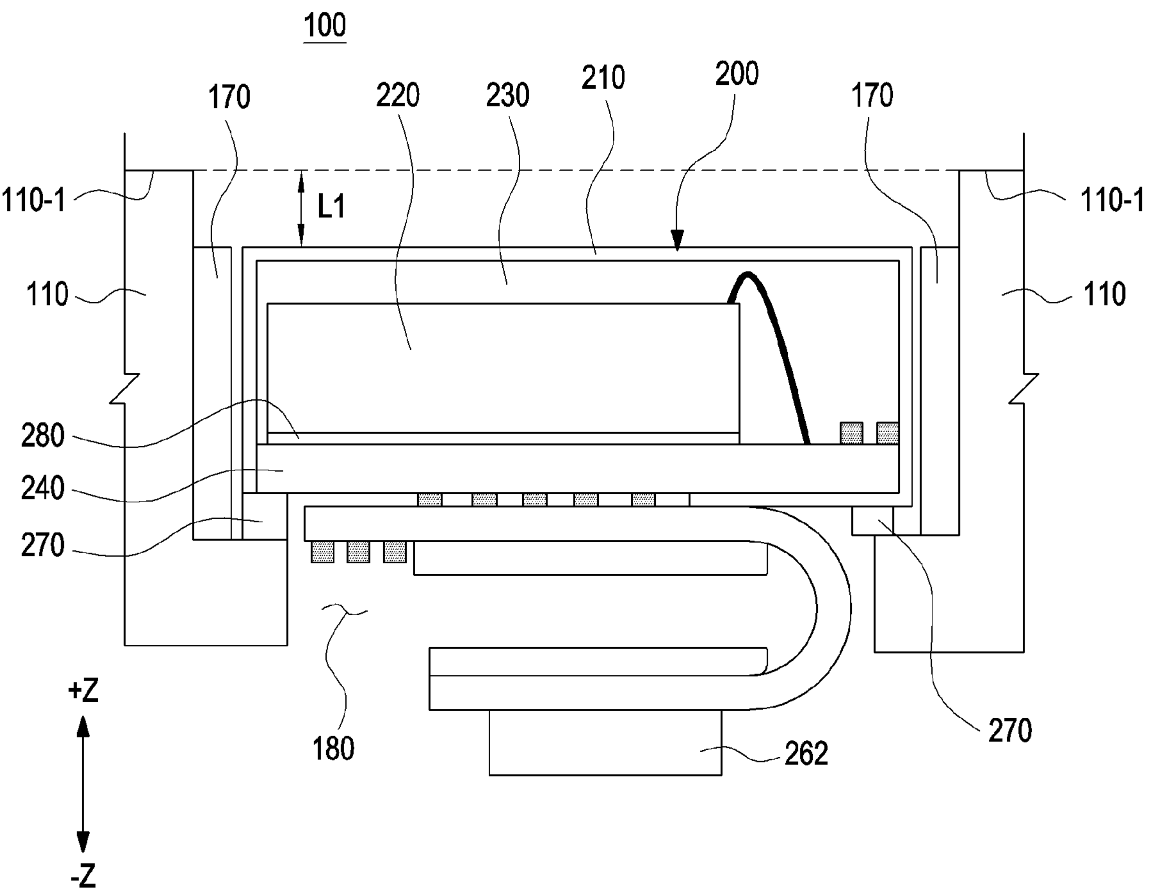
FIG. 9 is a cross-sectional view illustrating a sensor module disposed within a housing according to various embodiments of the disclosure.

FIG. 9 is a cross-sectional view illustrating a sensor module disposed within a housing according to various embodiments of the disclosure.

Referring to FIG. 9, the electronic device 100 may include the sensor module 200 disposed within an inner space 180 of the housing 110. The configuration of the housing 110 in FIG. 9 may be wholly or partially the same as that of the housing 110 in FIGS. 1 and 2, and the configuration of the sensor module 200 in FIG. 9 may be wholly or partially the same as that of the sensor module 200 in FIG. 5.

According to various embodiments, the sensor module 200 may be disposed on the housing 110. According to an embodiment, at least a part of the sensor module 200 may be disposed within the inner space 180 of the housing 110. The configuration of the inner space 180 may be wholly or partially the same as that of the recess structure (e.g., the recess structure 312 of FIG. 3) formed in the side bezel structure (e.g., the side bezel structure 310 of FIG. 3). According to an embodiment, the sensor module 200 may be connected to the housing 110 through the sealing member 270.

According to various embodiments, the electronic device 100 may include an insulation structure 170. According to an embodiment, the insulation structure 170 may reduce or prevent electrical interference (e.g., short circuit) of the sensor module 200. For example, the insulation structure 170 may prevent contact between the biosignal sensing electrode 210 and the housing 110. According to an embodiment, the insulation structure 170 may be disposed between the sensor module 200 and the housing 110 and surround at least a part of the sensor module 200. For example, the insulation structure 170 may face the second surface 200*b* (e.g., the side surface) of the sensor module 200.

According to an embodiment, the insulation structure 170 may be an insulation coating formed on the inner surface of the housing 110. For example, the housing 110 may include aluminum, and the insulation structure 170 may be interpreted as an anodizing layer formed on the aluminum. According to an embodiment, the insulation structure 170 may be a separate component disposed between the housing 110 and the sensor module 200 and substantially including an insulator (e.g., rubber and/or synthetic resin).

According to various embodiments, the housing 110 may include a protection area 110-1 to protect the sensor module 200 from impacts outside the electronic device 100. According to an embodiment, the protection area 110-1 may be located higher than the first surface 200*a* of the sensor module 200 (e.g., in the +Z direction). For example, the protection area 110-1 may protrude upward (in the +Z direction) higher than the first surface 200*a* of the sensor module 200 by a first length L1, and reduce or prevent direct contact with an external object and the sensor module 200. According to an embodiment, the protection area 110-1 may form at least a part of the side surface (e.g., the side surface 110C of FIG. 1) of the housing 110. At least a part of the side surface 110C may be interpreted as the protection area 110-1. According to another embodiment, the sensor module 200 may protrude above the housing 110 (e.g., in the +Z direction). Since at least a part of the sensor module 200 protrudes to the outside of the housing 110, the user's body (e.g., a finger) may easily come into contact with the sensor module 200.

According to various embodiments of the disclosure, an electronic device (e.g., the electronic device 100 of FIG. 1) may include a housing (e.g., the housing 110 of FIG. 1), a battery (e.g., the battery 370 of FIG. 3) disposed within the housing, and a sensor module (e.g., the sensor module 200 of FIG. 4A) at least partially disposed within the housing. The sensor module may include a board (e.g., the board 240 of FIG. 5), a biometric recognition sensor (e.g., the biometric recognition sensor 220 of FIG. 5) disposed on the board, a sealing member (e.g., the sealing member 230 of FIG. 5) surrounding at least a part of the board and the biometric recognition sensor, and a biosignal sensing electrode (e.g., the biosignal sensing electrode 210 of FIG. 5) surrounding at least a part of the sealing member, electrically connected to the board, and at least partially exposed to an outside of the housing.

According to various embodiments, the electronic device may further include a processor (e.g., the processor 202 of FIG. 5) configured to determine fingerprint information using the biometric recognition sensor, and determine biometric information using the biosignal sensing electrode.

According to various embodiments, the sensor module may include an FPCB (e.g., the FPCB 260 of FIG. 6) electrically connected to the biometric recognition sensor and the biosignal sensing electrode, and a connector (e.g., the connector 262 of FIG. 6) mounted on the FPCB.

According to various embodiments, the biosignal sensing electrode may form at least a part of a first surface (e.g., the first surface 200*a* of FIG. 5) of the sensor module, a third surface (e.g., the third surface 200*c* of FIG. 5) opposite to the first surface, and a second surface (e.g., the second surface 200*b* of FIG. 5) surrounding at least a part between the first surface and the third surface.

According to various embodiments, the sensor module may include a fingerprint sensing circuit (e.g., the fingerprint sensing circuit 222 of FIG. 6A).

According to various embodiments, the sensor module may include a first area (e.g., the first area 200-1 of FIG. 6A) overlapping with the biometric recognition sensor and a second area (e.g., the second area 200-2 of FIG. 6A) in which the biosignal sensing electrode is disposed, when the sensor module is viewed from above (e.g., from the +Z direction).

According to various embodiments, the sensor module may include an ultrasonic transmission/reception device (e.g., the ultrasonic transmission/reception device 224 of FIG. 7) configured to transmit or receive ultrasonic waves to an outside of the sensor module.

According to various embodiments, the sensor module may include a shielding member (e.g., the shielding member 290 of FIG. 5) located under the board (in the —Z direction of FIG. 5) and reducing introduction of at least some of ultrasonic waves radiated from (i.e., generated by) the ultrasonic transmission/reception device into the electronic device.

According to various embodiments, the electronic device may further include a sealing member (e.g., the sealing member 270 of FIG. 9) disposed between the sensor module and the housing.

According to various embodiments, the sensor module may include a color layer (e.g., the color layer 206 of FIG. 6A) disposed on the sealing member.

According to various embodiments, the electronic device may further include an insulation structure (e.g., the insulation structure 170 of FIG. 9) disposed between the sensor module and the housing and surrounding at least a part of the sensor module.

According to various embodiments, the housing may include a front surface (e.g., the front surface 110A of FIG. 1), a rear surface (e.g., the rear surface 110B of FIG. 2) opposite to the front surface, and a side surface (e.g., the side surface 110C of FIG. 2) surrounding at least a part between the front surface and the rear surface, and the side surface may include a recess structure (e.g., the recess structure 312 of FIG. 3) accommodating at least a part of the sensor module.

According to various embodiments, the sensor module may include a first surface (e.g., the first surface 200*a* of FIG. 9) exposed to an outside of the electronic device, and the housing may include a protection area (e.g., the protection area 110-1 of FIG. 9) forming at least a part of the side surface and located higher than the first surface of the sensor module (e.g., in the +Z direction in FIG. 9).

According to various embodiments, the electronic device may further include at least one fastening member (e.g., the fastening members 150 and 160 of FIG. 1) detachably connected to the housing.

According to various embodiments, the electronic device may further include at least one electrode structure (e.g., the electrode structures 111*a* and 111*b* of FIG. 2) disposed on the housing and spaced apart from the biosignal sensing electrode.

According to various embodiments of the disclosure, an electronic device (e.g., the electronic device 100 of FIG. 1) may include a housing (e.g., the housing 110 of FIG. 1), a battery (e.g., the battery 370 of FIG. 3) disposed within the housing, a sensor module (e.g., the sensor module 200 of FIG. 4A) at least partially disposed within the housing and including a biometric recognition sensor (e.g., the biometric recognition sensor 220 of FIG. 5) and a biosignal sensing electrode (e.g., the biosignal sensing electrode 210 of FIG. 5) surrounding at least a part of the biometric recognition sensor and at least partially exposed to an outside of the housing, and a processor (e.g., the processor 202 of FIG. 5) configured to determine fingerprint information using the biometric recognition sensor and determine biometric information using the biosignal sensing electrode.

According to various embodiments, the sensor module may include a board (e.g., the board 240 of FIG. 5) on which the biometric recognition sensor is mounted, a sealing member (e.g., the sealing member 230 of FIG. 5) surrounding at least a part of the biometric recognition sensor, and an FPCB (e.g., the FPCB 260 of FIG. 5) electrically connected to the biometric recognition sensor and the biosignal sensing electrode.

According to various embodiments, the sensor module may include a fingerprint sensing circuit (e.g., the fingerprint sensing circuit 222 of FIG. 6A). When the sensor module is viewed from above, the sensor module may include a first area (e.g., the first area 200-1 of FIG. 6A or FIG. 6B) overlapping with the fingerprint sensing circuit and a second area (e.g., the second area 200-2 of FIG. 6A or FIG. 6B) in which the biosignal sensing electrode is disposed.

According to various embodiments, the sensor module may include an ultrasonic transmission/reception device (e.g., the ultrasonic transmission/reception device 224 of FIG. 7) configured to transmit or receive ultrasonic waves to an outside of the sensor module, and include a shielding member (e.g., the shielding member 290 of FIG. 5) reducing introduction of at least some of ultrasonic waves radiated from the ultrasonic transmission and reception device into the electronic device.

According to various embodiments of the disclosure, a sensor module (e.g., the sensor module 200 of FIG. 4A) may include a board (e.g., the board 240 of FIG. 5), a biometric recognition sensor (e.g., the biometric recognition sensor 220 of FIG. 5) disposed on the board, a sealing member (e.g., the sealing member 230 of FIG. 5) surrounding at least a part of the board and the biometric recognition sensor, a biosignal sensing electrode (e.g., the biosignal sensing electrode 210 of FIG. 5) surrounding at least a part of the sealing member and electrically connected to the board, and a processor (e.g., the processor 202 of FIG. 5) configured to determine finger print information using the biometric recognition sensor and determine biometric information using the biosignal sensing electrode.

The electronic device including the above-described sensor module according to the disclosure is not limited to the foregoing embodiments and drawings, and it will be apparent to those skilled in the art that many replacements, modifications, and variations can be made within the technical scope of the disclosure.

What is claimed is:

1. A wearable electronic device configured to be wearable around a user's wrist, the wearable electronic device comprising:

a housing comprising a front surface, a rear surface opposite to the front surface, and a side surface surrounding at least a part between the front surface and the rear surface and formed by a side bezel structure, wherein the side bezel structure comprises a recess structure;

a battery disposed in the housing;

a main printed circuit board disposed in the housing; and a sensor module at least partially disposed in the recess structure, wherein the sensor module comprises:

a board;

a biometric recognition sensor disposed on the board, wherein the biometric recognition sensor is configured to detect fingerprint information;

a sealing member on at least a part of the board encapsulating the biometric recognition sensor together with the board;

a biosignal sensing electrode spaced apart from the biometric recognition sensor and configured to detect a bioelectrical signal, wherein the biosignal sensing electrode is electrically connected to the board and at least partially exposed outside of the housing; and a flexible printed circuit board electrically connected to the board and configured to electrically connect the board to the main printed circuit board, and wherein the biosignal sensing electrode covers and contacts with the sealing member.

2. The wearable electronic device of claim 1, wherein the sensor module further comprises a connector mounted on the flexible printed circuit board.

3. The wearable electronic device of claim 1, wherein the biosignal sensing electrode forms at least a part of a first surface of the sensor module, a third surface of the sensor module opposite to the first surface, and a second surface of the sensor module around at least a part between the first surface and the third surface.

4. The wearable electronic device of claim 1, wherein the sensor module further comprises a fingerprint sensing circuit.

5. The wearable electronic device of claim 1, wherein the sensor module further comprises a first area overlapping with the biometric recognition sensor and a second area in which the biosignal sensing electrode is disposed.

6. The wearable electronic device of claim 1, wherein the sensor module further comprises an ultrasonic transceiver configured to transmit or receive ultrasonic waves.

7. The wearable electronic device of claim 6, wherein the sensor module further comprises a shielding member disposed under the board, wherein the shielding member is configured to reduce propagation, into the wearable electronic device, of ultrasonic waves generated by the ultrasonic transceiver.

8. The wearable electronic device of claim 1, further comprising a second sealing member between the sensor module and the housing.

9. The wearable electronic device of claim 1, wherein the sensor module further comprises a color layer disposed on the sealing member.

10. The wearable electronic device of claim 1, further comprising an insulation structure disposed between the sensor module and the housing and surrounding at least a part of the sensor module.

11. The wearable electronic device of claim 1, wherein the sensor module further comprises a first surface exposed outside of the wearable electronic device, and wherein the housing further comprises a protection area forming at least a part of the side surface and located higher than the first surface of the sensor module.

12. The wearable electronic device of claim 1, further comprising at least one fastening member detachably connected to the housing.

13. The wearable electronic device of claim 1, further comprising at least one electrode structure on the housing and spaced apart from the biosignal sensing electrode.

* * * * *